US007480906B2

(12) United States Patent
Joffrain et al.

(10) Patent No.: US 7,480,906 B2
(45) Date of Patent: *Jan. 20, 2009

(54) PROGRAMMATICALLY ANALYZING AND MODIFYING A REMOTE GRAPHICAL PROGRAM VIA A NETWORK

(75) Inventors: Philippe G. Joffrain, Austin, TX (US); Joel Sumner, Austin, TX (US); Darshan K. Shah, Round Rock, TX (US); Darren M. Nattinger, Cedar Park, TX (US)

(73) Assignee: National Instruments Corporation, Austin, TX (US)

( * ) Notice: Subject to any disclaimer, the term of this patent is extended or adjusted under 35 U.S.C. 154(b) by 728 days.

This patent is subject to a terminal disclaimer.

(21) Appl. No.: 10/382,118

(22) Filed: Mar. 5, 2003

(65) Prior Publication Data

US 2004/0034696 A1    Feb. 19, 2004

Related U.S. Application Data

(60) Provisional application No. 60/403,351, filed on Aug. 14, 2002.

(51) Int. Cl.
*G06F 9/44* (2006.01)
(52) U.S. Cl. .................... 717/171; 717/100
(58) Field of Classification Search ............ 717/105, 717/113, 125
See application file for complete search history.

(56) References Cited

U.S. PATENT DOCUMENTS

| 4,812,996 | A | 3/1989 | Stubbs |
| 4,831,580 | A | 5/1989 | Yamada |
| 4,868,785 | A | 9/1989 | Jordan et al. |
| 4,884,228 | A | 11/1989 | Stanley et al. |
| 5,136,705 | A | 8/1992 | Stubbs et al. |
| 5,155,836 | A | 10/1992 | Jordan et al. |
| 5,309,352 | A | 5/1994 | Stubbs et al. |
| 5,481,741 | A | 1/1996 | McKaskle et al. |
| 5,630,164 | A | 5/1997 | Williams et al. |
| 5,801,942 | A | 9/1998 | Nixon et al. |
| 5,812,394 | A | 9/1998 | Lewis et al. |

(Continued)

FOREIGN PATENT DOCUMENTS

EP    1077404    2/2001

*Primary Examiner*—Wei Y. Zhen
*Assistant Examiner*—Philip R. Wang
(74) *Attorney, Agent, or Firm*—Meyertons Hood Kivlin Kowert & Goetzel, P.C.; Jeffrey C. Hood; Jason L. Burgess

(57) ABSTRACT

A system and method for programmatically analyzing and modifying a graphical program via a network. The graphical program may be stored on a memory medium at a first location. A program may be executed on a computer system at a second location. The computer system at the second location may be coupled via a network to the memory medium at the first location or may be coupled to a computer system or device which includes or has access to the memory medium at the first location. The program on the computer system at the second location may execute to programmatically analyze the graphical program via the network. In one embodiment the program on the computer system at the second location may also execute to programmatically modify the graphical program via the network, based on the programmatic analysis of the graphical program.

21 Claims, 12 Drawing Sheets

U.S. PATENT DOCUMENTS

| | | | |
|---|---|---|---|
| 5,828,851 A | 10/1998 | Nixon et al. | |
| 5,838,563 A | 11/1998 | Dove et al. | |
| 5,861,882 A | 1/1999 | Sprenger et al. | |
| 5,959,633 A * | 9/1999 | McFarland et al. | 345/441 |
| 5,966,532 A | 10/1999 | McDonald et al. | |
| 5,970,471 A | 10/1999 | Hill | |
| 5,991,537 A | 11/1999 | McKeon et al. | |
| 6,064,816 A | 5/2000 | Parthasarathy et al. | |
| 6,078,320 A | 6/2000 | Dove et al. | |
| 6,083,267 A | 7/2000 | Motomiya et al. | |
| 6,098,028 A | 8/2000 | Zwan et al. | |
| 6,167,383 A | 12/2000 | Henson | |
| 6,327,624 B1 * | 12/2001 | Mathewson et al. | 709/231 |
| 6,339,763 B1 | 1/2002 | Divine et al. | |
| 6,412,106 B1 * | 6/2002 | Leask et al. | 717/124 |
| 6,437,805 B1 | 8/2002 | Sojoodi et al. | |
| 6,453,464 B1 | 9/2002 | Sullivan et al. | |
| 6,931,633 B1 * | 8/2005 | Vazquez et al. | 717/131 |
| 7,028,222 B2 * | 4/2006 | Peterson et al. | 714/38 |
| 2001/0020291 A1 | 9/2001 | Kudukoli et al. | |
| 2001/0024211 A1 | 9/2001 | Kudukoli et al. | |
| 2001/0034879 A1 | 10/2001 | Washington et al. | |
| 2001/0035879 A1 * | 11/2001 | Washington et al. | 345/763 |
| 2002/0083413 A1 | 6/2002 | Kodosky et al. | |
| 2002/0089538 A1 * | 7/2002 | Wenzel et al. | 345/763 |
| 2002/0129333 A1 | 9/2002 | Chandhoke et al. | |
| 2003/0036875 A1 * | 2/2003 | Peck et al. | 702/127 |
| 2003/0107599 A1 * | 6/2003 | Fuller et al. | 345/763 |
| 2004/0015924 A1 * | 1/2004 | Shah et al. | 717/154 |
| 2004/0034696 A1 | 2/2004 | Joffrain et al. | |
| 2004/0034847 A1 | 2/2004 | Joffrain et al. | |
| 2005/0028138 A1 | 2/2005 | Case et al. | |
| 2005/0091602 A1 | 4/2005 | Ramamoorthy et al. | |

* cited by examiner

PROGRAMMATICALLY ANALYZING AND MODIFYING A REMOTE GRAPHICAL PROGRAM VIA A NETWORK

PRIORITY CLAIM

This application claims benefit of priority of U.S. provisional application Ser. No. 60/403,351 titled "Programmatically Analyzing and Modifying a Graphical Program" filed Aug. 14, 2002, whose inventors are Joel Sumner, Daniel Hedges, Phil Joffrain and Darren Nattinger.

FIELD OF THE INVENTION

The present invention relates to the fields of computer software and graphical programming. More particularly, the invention relates to a system and method for programmatically analyzing and modifying a remote graphical program via a network.

DESCRIPTION OF THE RELATED ART

Traditionally, high level text-based programming languages have been used by programmers in writing application programs. Many different high level programming languages exist, including BASIC, C, Java, FORTRAN, Pascal, COBOL, ADA, APL, etc. Programs written in these high level languages are translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

Examples of fields in which computer systems are employed to interact with physical systems are the fields of instrumentation, process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as, for example, assembly language, C, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C, Basic, Java, etc.

The method disclosed in Kodosky et al allows a user to construct a diagram using a block diagram editor. The block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

Therefore, Kodosky et al teaches a graphical programming environment wherein a user places or manipulates icons and interconnects or "wires up" the icons in a block diagram using a block diagram editor to create a graphical "program." A graphical program for performing an instrumentation, measurement or automation function, such as measuring a Unit Under Test (UUT) or device, controlling or modeling instruments, controlling or measuring a system or process, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation, and numerical analysis, as well as for any type of general programming.

A graphical program may have a graphical user interface. For example, in creating a graphical program, a user may create a front panel or user interface panel. The graphical user interface may include various graphical user interface elements or front panel objects, such as user interface controls and/or indicators that represent or display the respective input and output used or produced by the graphical program or VI, and may include other icons which represent devices being controlled. The graphical user interface may be comprised in a single window of user interface elements, or may comprise a plurality of individual windows each having one or more user interface elements, wherein the individual windows may optionally be tiled together. When the user interface controls and indicators are created, corresponding icons or terminals may be automatically created in the block diagram. Alternatively, the user can place terminal icons in the block diagram which may cause the display of corresponding user interface elements in the graphical user interface, either at edit time or later at run time. As another example, the graphical user interface panel may comprise user interface elements or front panel objects, e.g., the GUI, embedded in the block diagram. Further, the user interface may be characterized as a "front panel" where the user may interactively control or manipulate the input being provided to the graphical program and view the resulting output during program execution.

During creation of the block diagram portion of the graphical program, the user may select various function nodes or icons that accomplish his desired result and connect the function nodes together. For example, the function nodes may be connected in one or more of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus the user may create or assemble a graphical program, referred to as a block diagram, graphically representing the desired process. The assembled graphical program may be represented in the memory of the computer system as data structures and/or program instructions. The assembled graphical program, i.e., these data structures, may then be compiled or interpreted to produce machine language that accomplishes the desired method or process as shown in the block diagram.

Input data to a graphical program may be received from any of various sources, such as from a device, unit under test, a process being measured or controlled, another computer program, or from a file. Also, a user may input data to a graphical program or virtual instrument using a graphical user interface, e.g., a front panel as described above. The input data may propagate through the block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the user interface may be used merely to view the input and output, or just the output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, image processing/machine vision applications, and motion control, among others.

Users typically create graphical programs manually, e.g., using a block diagram editor as described above. In prior systems, users have generally been responsible for manually making any changes required to a graphical program. However, in many instances it would be desirable to assist users by automatically analyzing a graphical program for various purposes. It may also be desirable to automatically modify the graphical program based on the analysis. As one example, it may be desirable to provide a system and method to automatically analyze a graphical program to determine factors which limit the program's performance and to automatically modify the graphical program to improve its performance. As other examples, it may be desirable to automatically analyze and modify a graphical program to correct errors in the graphical program, to update the graphical program, to change the functionality of the graphical program, to change the style of the graphical program's graphical user interface, etc.

SUMMARY

One embodiment of the present invention comprises a method for programmatically analyzing and modifying a graphical program via a network. According to one embodiment of the method, the graphical program may be stored on a memory medium at a first location. For example, in various embodiments, storing the graphical program may comprise storing the graphical program on or in one or more of a disk drive, a file system, random access memory (RAM), a magnetic medium, and/or an optical medium.

A program may be executed on a computer system at a second location. As described below, the program may be involved in programmatically analyzing and/or programmatically modifying the graphical program. The computer system at the second location may be coupled via a network to the memory medium at the first location or may be coupled to a computer system or device which includes or has access to the memory medium at the first location. In various embodiments, the second location may be anywhere relative to the first location. For example, in one embodiment the computer at the second location may be coupled via the Internet to a geographically remote computer system which stores the graphical program. In another embodiment, the computer system at the second location may be coupled via a LAN to a relatively near device or instrument on which the graphical program is stored or deployed.

The program on the computer system at the second location may execute to programmatically analyze the graphical program via the network. In one embodiment the program on the computer system at the second location may also execute to programmatically modify the graphical program via the network, based on the programmatic analysis of the graphical program. In various embodiments, the graphical program may be programmatically analyzed and/or modified for any of various purposes. As one example, it may be desirable to programmatically analyze a graphical program to determine factors which limit the program's performance and to programmatically modify the graphical program to improve its performance. As other examples, it may be desirable to programmatically analyze and modify a graphical program to correct errors in the graphical program, to update the graphical program, to change functionality of or add functionality to the graphical program, to change the style of the graphical program's graphical user interface, etc.

In various embodiments, any of various communication techniques may be used to programmatically analyze/modify the graphical program via the network. Where the graphical program is stored on a memory medium of a first computer system at the first location, the computer system at the second location (also referred to as the second computer system) may communicate with the first computer system via the network to programmatically analyze/modify the graphical program.

In one embodiment, a program executing on the first computer system may request modification of the graphical program, e.g., in a client/server fashion. In one embodiment, the modification may be requested in response to user input received to the first computer system. For example, a user may execute a program on the first computer system which presents a graphical user interface allowing the user to specify desired analyses to perform on the graphical program and/or desired modifications to make to the graphical program. The program on the first computer system may then transmit the information specified by the user to the second computer system. In response, the program on the second computer system may communicate with the program on the first computer system to programmatically analyze and/or modify the graphical program according to the information specified by the user.

In various embodiments, the actual modification to the graphical program may be performed by the first computer system, the second computer system, or a combination of both. For example, in one embodiment the graphical program may be sent from the first computer system to the second computer system. The program on the second computer system may then programmatically analyze/modify the graphical program and send a modified version of the graphical program back to the first computer system. The first computer system may then replace the graphical program on the memory medium with the modified version of the graphical program, e.g., may replace the graphical program in the first computer system's RAM or on a disk drive or other memory medium associated with the first computer system.

In another embodiment, the graphical program may not need to be sent to the second computer system. For example, the program on the first computer system may include an application programming interface (API) through which the program on the second computer system can issue commands to obtain information regarding the graphical program and request modifications to the graphical program. In this example, the program on the second computer system may include the logic necessary for controlling the analysis/modification to the graphical program, and the program on the first computer system may simply respond to commands or requests from the program on the second computer system.

As noted above, in one embodiment the graphical program may be programmatically analyzed/modified in response to a user requesting a desired analysis or modification of the graphical program. In various embodiments, the user may specify the desired analysis/modification in any of various ways. In one embodiment, the desired analysis/modification may be specified indirectly. For example, the user may interact with a graphical user interface to specify desired characteristics or functionality of the graphical program. The program on the second computer system may then execute to analyze the graphical program to determine necessary modifications or additions to the graphical source code of the graphical program so that the modified graphical program has the specified characteristics or functionality. As one example, the user may utilize a tool specialized for measurement applications which is operable to communicate with a remote computer server (i.e., the computer system at the second location) to request that the graphical program be modified to perform a specified measurement or instrumentation task (or to request creation of a graphical program operable to perform a specified measurement or instrumentation task).

In the examples discussed above, the computer system at the second location may analyze/modify the graphical program in response to a request received from a computer system at the first location. In other embodiments, the analysis/modification of the graphical program may be initiated by the computer system at the second location. For example, in one embodiment the graphical program may be stored or deployed on a configurable device coupled to the computer system at the second location via the network. In this example, the computer system at the second location may initiate communication with the configurable device to programmatically analyze/modify the graphical program and may possible re-deploy the modified graphical program on the configurable device.

In one embodiment results of the programmatic analysis of the graphical program may be displayed, e.g., one or more suggested modifications to the graphical program may be displayed. For example, where the analysis is initiated by a user of a first computer system at the first location, the suggested modifications may be displayed on a display of the first computer system. The user may be able to specify which of the displayed modifications to make to the graphical program. As another example, where the second computer system initiates the analysis of the graphical program, the results of the analysis, e.g., the suggested modifications, may be displayed on a display of the second computer system.

BRIEF DESCRIPTION OF THE DRAWINGS

A better understanding of the present invention can be obtained when the following detailed description of the preferred embodiment is considered in conjunction with the following drawings, in which.

Figure 1:
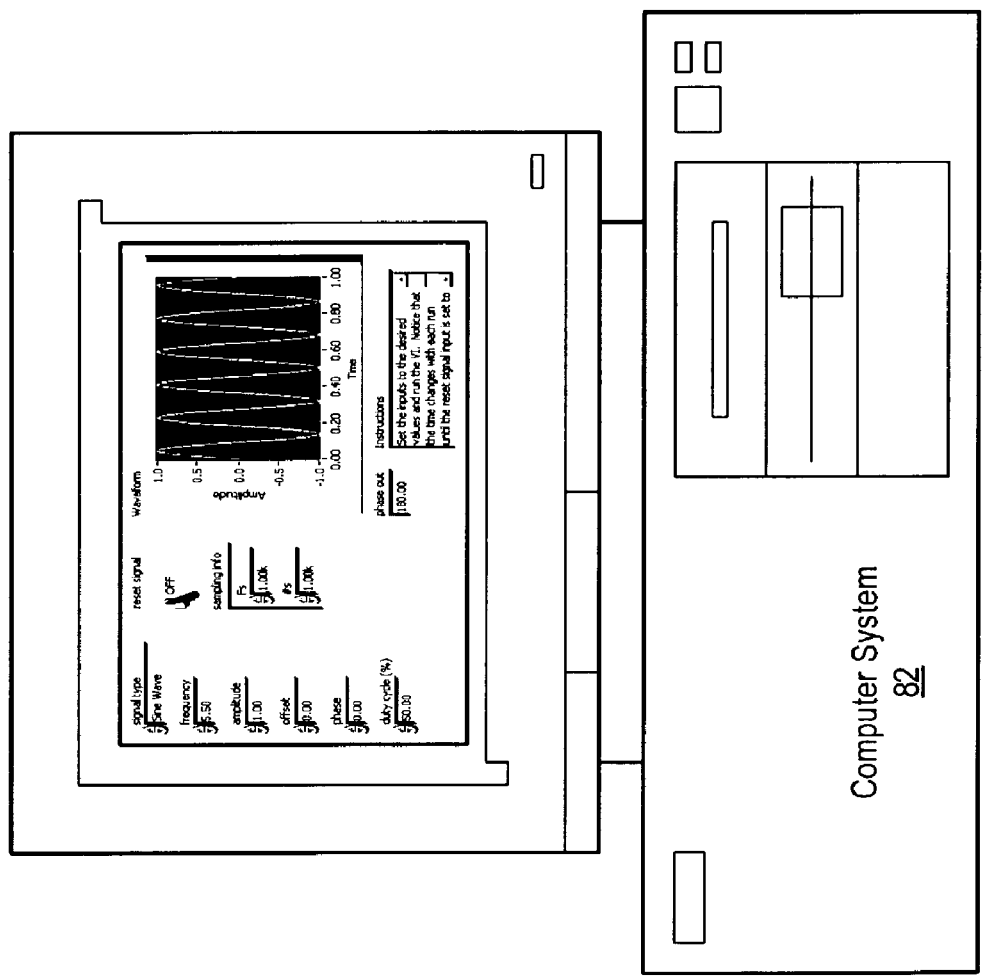
FIG. 1 illustrates a computer system operable to programmatically analyze a graphical program and programmatically modify the graphical program based on the analysis.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Incorporation By Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. patent application Ser. No. 09/617,600 titled "Graphical Programming System with Distributed Block Diagram Execution and Front Panel Display," filed Jun. 13, 2000.

U.S. patent application Ser. No. 09/518,492 titled "System and Method for Programmatically Creating a Graphical Program," filed Mar. 3, 2000.

U.S. patent application Ser. No. 09/745,023 titled "System and Method for Programmatically Generating a Graphical Program in Response to Program Information," filed Dec. 20, 2000.

U.S. patent application Ser. No. 10/101,512 titled "Network-based System for Configuring a Measurement System using Configuration Information Generated based on a User Specification," filed Mar. 19, 2002.

U.S. patent application Ser. No. 10/123,570 titled "Creation of a Graphical Program Through Graphical Association of a Data Point Element with the Graphical Program," filed Apr. 16, 2002.

U.S. patent application Ser. No. 10/198,213 titled "Wizard for Programmatically Analyzing and Modifying Time-Critical Graphical Programs," filed Jul. 18, 2002.

U.S. patent application Ser. No. 10/177,553 titled "Target Device-Specific Syntax and Semantic Analysis For a Graphical Program," filed Jun. 21, 2002.

The LabVIEW and BridgeVIEW graphical programming manuals, including the "G Programming Reference Manual", available from National Instruments Corporation, are also hereby incorporated by reference in their entirety.

FIG. 1—Computer System

FIG. 1 illustrates a computer system 82 operable to programmatically analyze a graphical program and programmatically modify the graphical program based on the analysis. The computer system 82 may programmatically, i.e., automatically, analyze and modify the graphical program for any of various reasons. As one example, it may be desirable to programmatically analyze a graphical program to determine factors which limit the program's performance and to programmatically modify the graphical program to improve its performance. As other examples, it may be desirable to programmatically analyze and modify a graphical program to correct errors in the graphical program, to update the graphical program, to add or change functionality of the graphical program, to change the style of the graphical program's graphical user interface, etc. In various embodiments, the graphical program that is programmatically analyzed and modified may be any type of graphical program and may perform any function.

As used herein, the term "programmatically" is intended to mean that the associated operation is performed by a program (as opposed to being performed manually by a user), such as a program executing in a computer or a program executing in a programmable hardware device such as an FPGA.

In the present application, the term "graphical program" or "block diagram" is intended to include a program comprising graphical source code, e.g., two or more interconnected nodes or icons, wherein the interconnected nodes or icons may visually indicate the functionality of the program. The nodes may be connected in one or more of a data flow, control flow, and/or execution flow format. The nodes may also be connected in a "signal flow" format, which is a subset of data flow. Thus the terms "graphical program" or "block diagram" are each intended to include a program comprising a plurality of interconnected nodes or icons which visually indicate the functionality of the program. A data flow graphical program or data flow diagram refers to a graphical program or block diagram wherein the interconnections between nodes or blocks indicate that data produced by one block is used by another block.

A graphical program may also comprise a user interface or front panel. The user interface portion may be contained in the block diagram or may be contained in one or more separate panels or windows. The user interface of a graphical program may include various graphical user interface elements or front panel objects, such as user interface controls and/or indicators, that represent or display the respective input and/or output used or produced by the graphical program or VI, and may include other icons which represent devices being controlled. The user interface may be comprised in a single window of user interface elements, or may comprise a plurality of individual windows each having one or more user interface elements, wherein the individual windows may optionally be tiled together. As another example, the user interface may comprise user interface or front panel objects, e.g., the GUI, embedded in the block diagram. The user interface of a graphical program may display only output, only input, or both input and output. Further, the user interface may be characterized as a "front panel" where the user may interactively control or manipulate the input being provided to the graphical program and view the resulting output during program execution.

Examples of graphical programming development environments that may be used to create graphical programs include LabVIEW, DasyLab, and DiaDem from National Instruments, VEE from Agilent, WiT from Coreco, Vision Program Manager from PPT Vision, SoftWIRE from Measurement Computing, Simulink from the MathWorks, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

Referring again to FIG. 1, the computer system 82 may be any type of computer system, including a personal computer system, mainframe computer system, workstation, network appliance, Internet appliance, personal digital assistant (PDA), television system, or other device. In general, the term "computer system" can be broadly defined to encompass any device having at least one processor that executes instructions from a memory medium.

The computer system 82 may include a memory medium (s) on which one or more computer programs or software components may be stored. For example, the memory medium may store one or more graphical programs which are to be analyzed/modified according to the methods described herein. Also, the memory medium may store a program operable to programmatically analyze and modify the graphical program(s). The memory medium may also store operating system software, as well as other software for operation of the computer system.

The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

Various embodiments further include receiving or storing instructions and/or data implemented in accordance with the present description upon a carrier medium. Suitable carrier media include a memory medium as described above, as well as signals such as electrical, electromagnetic, or digital signals, conveyed via a communication medium such as networks and/or a wireless link.

Figure 1A:
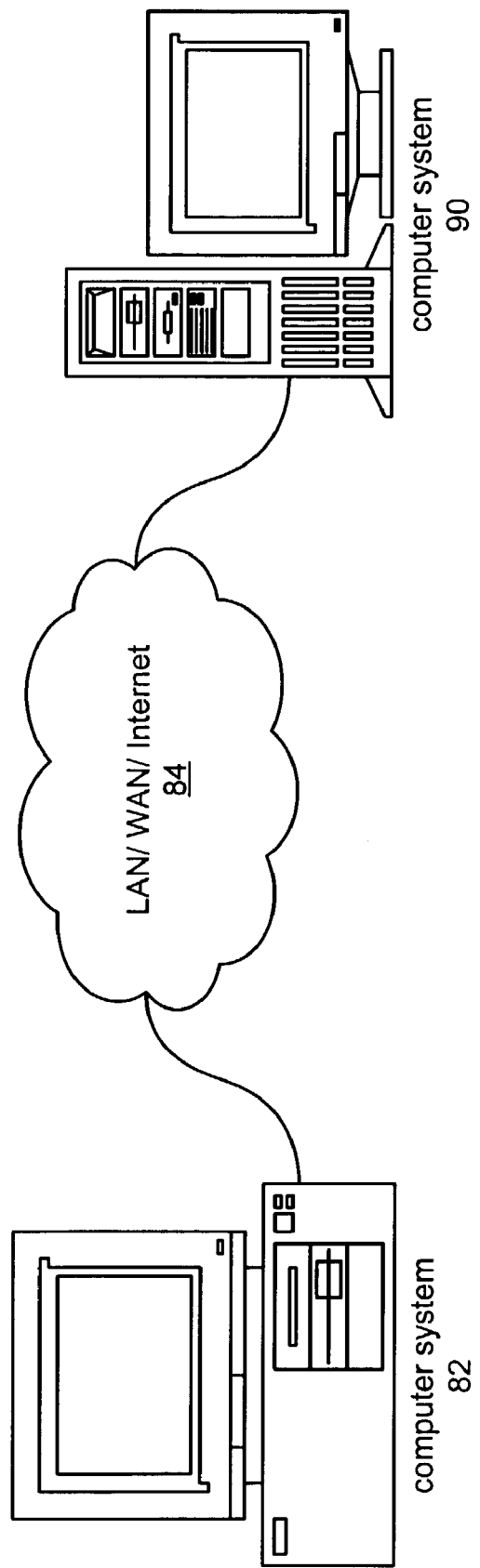
FIGS. 1A and 1B illustrate exemplary systems for programmatically analyzing and/or modifying a graphical program via a network.

FIG. 1A—Distributed System

In various embodiments, a graphical program may be programmatically analyzed and/or modified via a network. FIG. 1A illustrates one embodiment of a system for programmatically analyzing and modifying a graphical program via a network 84. FIG. 1A illustrates the computer system 82 of FIG. 1 coupled by a network 84 to a second computer system 90. The computer systems 82 and 90 may each be any of various types. Also, the network 84 can be any of various types, including a LAN (local area network), WAN (wide area network), the Internet, or an Intranet, among others. Example local area networks include Ethernet networks, Token Ring networks, and various industrial communication networks such as Foundation Fieldbus, DeviceNet, and CAN (Controller Area Network) networks. The computer systems 82 and 90 may also be connected using wireless communication means, such as wireless protocols including IEEE 802.11 (wireless Ethernet), Bluetooth, or other types of wireless communication.

In various embodiments, the computer systems 82 and 90 may operate together in any of various fashions to programmatically analyze and/or modify a graphical program. For example, in one embodiment, the graphical program may be located on the computer system 82 (or on a memory medium associated with the computer system 82). The computer system 90 may be operable to communicate with the computer system 82 to programmatically analyze and modify the graphical program. As one example, the computer system 82 may act as a client computer, and the computer system 90 may act as a server computer. For example, the computer system 82 may connect to the computer system 90 and request the computer system 90 to analyze and/or modify the graphical program.

Figure 1B:
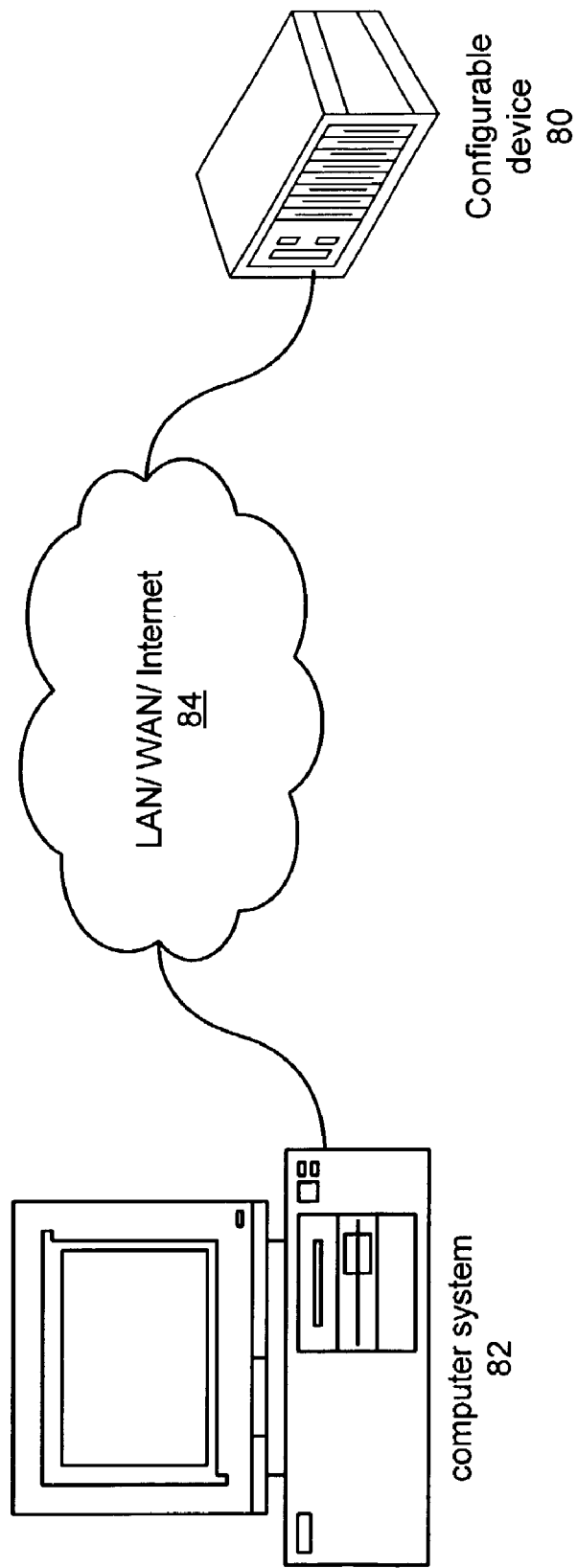

FIG. 1B illustrates another embodiment of a system for programmatically analyzing and modifying a graphical program via a network 84. In this example, the computer system 82 is coupled to a configurable device 80. The graphical program may be deployed for execution on the configurable device 80. For example, the configurable device 80 may comprise any of various types of devices or instruments that include a functional unit, such as a processor and memory, or a programmable hardware element, which enables the device to be programmed with or execute program instructions. In one embodiment, the configurable device 80 may be one of the devices or instruments illustrated in FIGS. 2A and 2B. As used herein, the term "programmable hardware element" is intended to include various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware.

The computer system 82 may be operable to programmatically analyze and/or modify the graphical program deployed on the configurable device 80. For example, the configurable device 80 may be coupled to the computer system 82 by a network 84, similarly as described above. Thus, the computer system 82 may communicate with the configurable device 80 via the network 84 to programmatically analyze and/or modify the graphical program. In another embodiment, the configurable device 80 may be coupled to the computer system 82 by a computer bus, an I/O slot, a serial or parallel bus, or other wired or wireless communication methods. Example parallel buses include the PCI bus, PXI bus, GPIB, and VXI bus, among others. Example serial buses include USB (Universal Serial Bus), IEEE 1394, RS-242, and RS-485, among others.

Figure 2A:
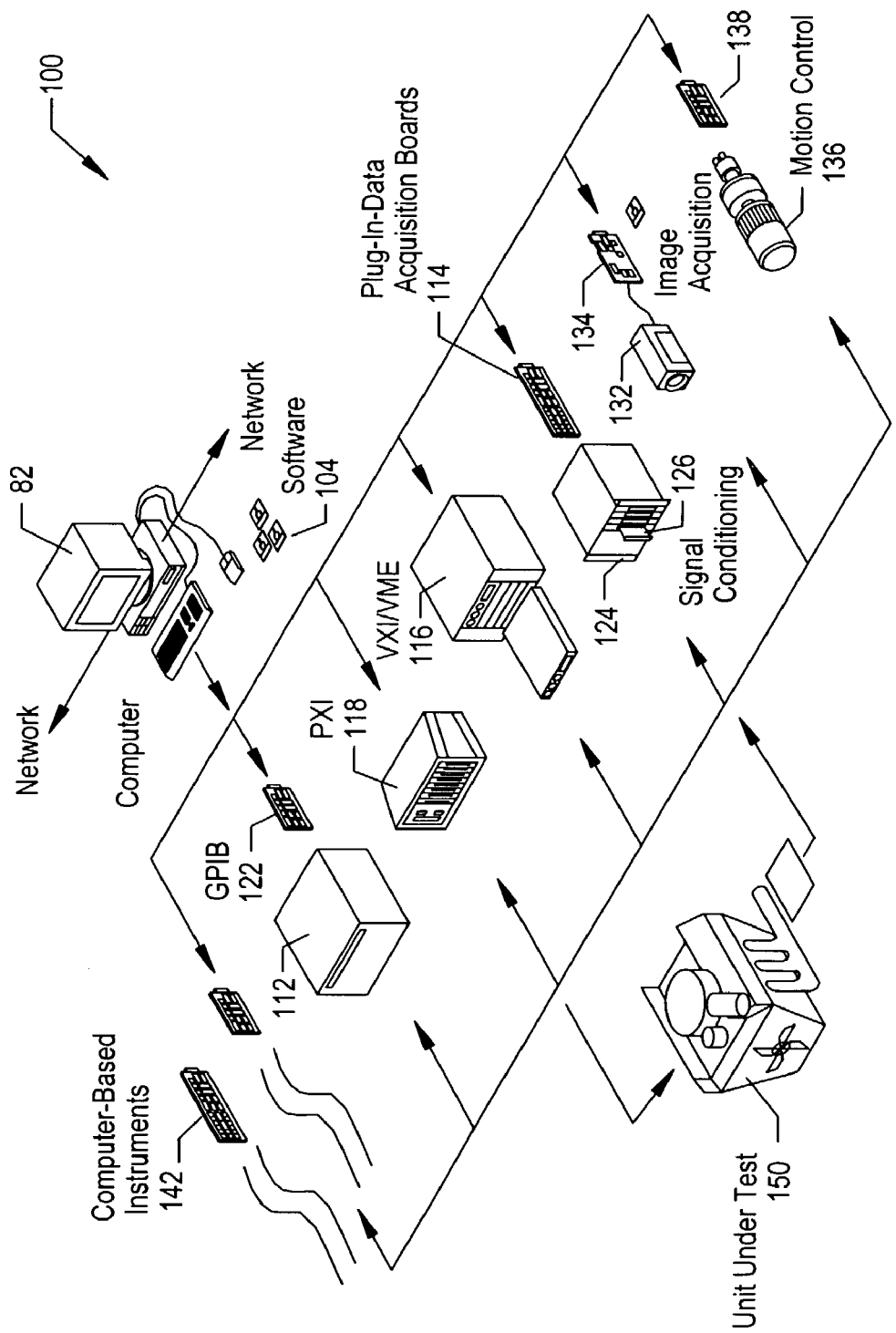
FIG. 2A illustrates an exemplary instrumentation control system.
Figure 2B:
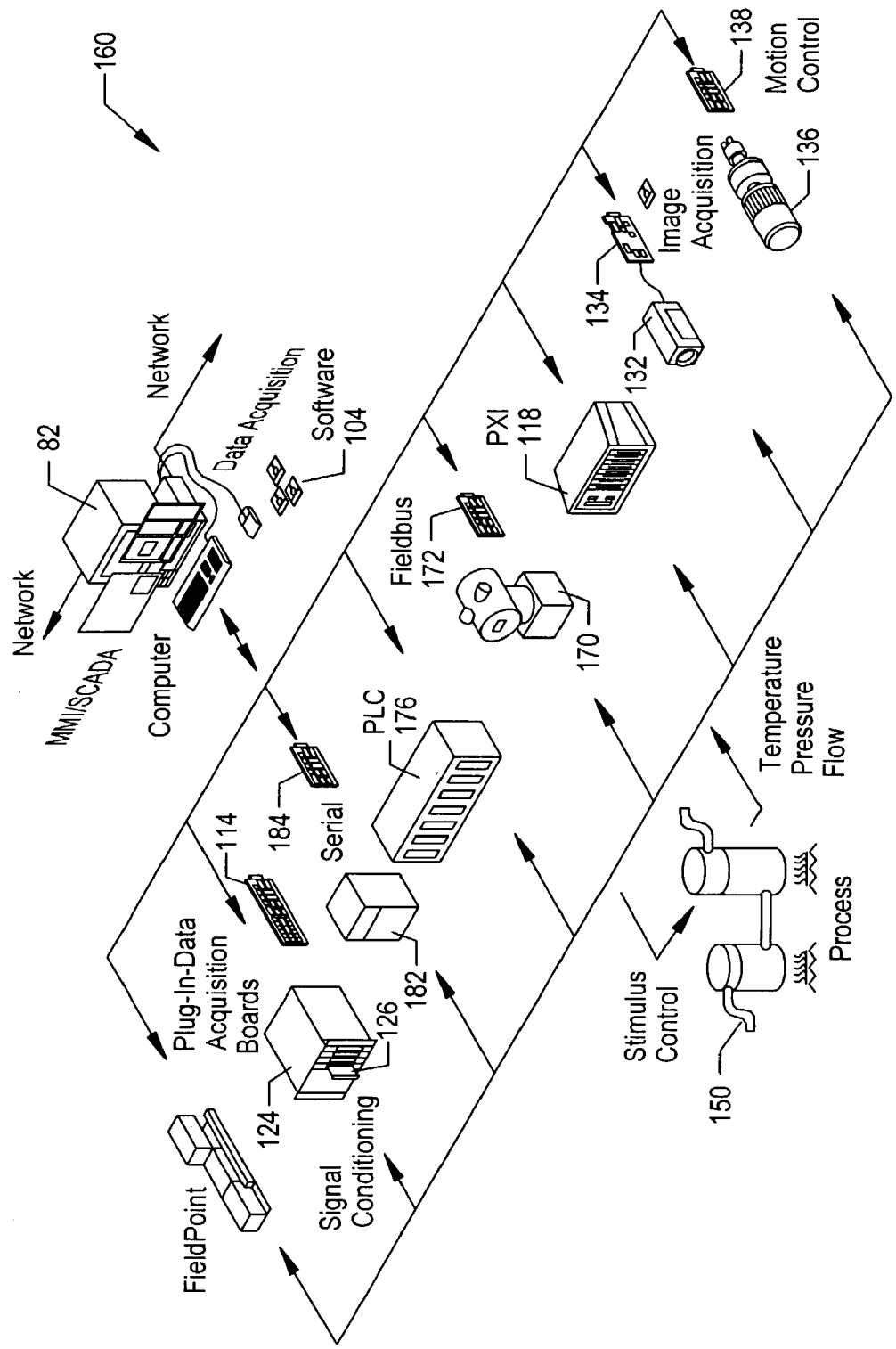
FIG. 2B illustrates an exemplary industrial automation system.

FIGS. 2A and 2B—Instrumentation and Industrial Automation Systems

The following describes embodiments of the present invention involved with performing test and/or measurement functions and/or controlling and/or modeling instrumentation or industrial automation hardware. However, it is noted that the present invention can be used for a plethora of applications and is not limited to instrumentation or industrial automation applications. In other words, the following description is exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, games, etc.

FIG. 2A illustrates an exemplary instrumentation control system 100. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

In one embodiment, a graphical program that is programmatically analyzed and modified as described herein may be a program that interacts with or controls one or more of the instruments shown in FIG. 2A. In another embodiment, the graphical program (or a portion of the graphical program) may be executed on one or more of the instruments. For example, in one embodiment, one or more of the instruments may include an embedded CPU and memory and may execute a real time kernel and a graphical program execution engine to enable execution of graphical programs in a real-time or deterministic manner. For example, one or more of the GPIB card 122, the DAQ card 114, or the VXI card may comprise an embedded system. Alternatively, or in addition, one or more of the GPIB instrument 112, the VXI instrument 116, or the serial instrument may comprise an embedded system.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices.

The GPIB instrument 112 may be coupled to the computer 82 via the GPIB interface card 122 provided by the computer 82. In a similar manner, the video device 132 may be coupled to the computer 82 via the image acquisition card 134, and the motion control device 136 may be coupled to the computer 82 through the motion control interface card 138. The data acquisition board 114 may be coupled to the computer 82, and may interface through signal conditioning circuitry 124 to the UUT. The signal conditioning circuitry 124 may comprise an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 82, such as a PCI bus slot, a PC Card slot, or an ISA, EISA or Micro-Channel bus slot provided by the computer 82. However, these cards 122, 134, 138 and 114 are shown external to computer 82 for illustrative purposes. These devices may also be connected to the computer 82 through a serial bus or through other means.

The VXI chassis or instrument 116 may be coupled to the computer 82 via a VXI bus, MXI bus, or other serial or parallel bus provided by the computer 82. The computer 82 may include VXI interface logic, such as a VXI, MXI or GPIB interface card (not shown), which interfaces to the VXI chassis 116. The PXI chassis or instrument may be coupled to the computer 82 through the computer's PCI bus.

A serial instrument (not shown) may also be coupled to the computer 82 through a serial port, such as an RS-232 port, USB (Universal Serial bus) or IEEE 1394 or 1394.2 bus, provided by the computer 82. In typical instrumentation control systems an instrument will not be present of each interface type, and in fact many systems may only have one or more instruments of a single interface type, such as only GPIB instruments.

The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application.

FIG. 2B illustrates an exemplary industrial automation system 160. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control.

In one embodiment, a graphical program that is programmatically analyzed and modified as described herein may be a program that interacts with or controls one or more of the devices shown in FIG. 2B. In another embodiment, the graphical program (or a portion of the graphical program) may be executed on one or more of the devices, similarly as described above with reference to FIG. 2A.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 134 may be connected to the computer 82 as described above. The serial instrument 182 may be coupled to the computer 82 through a serial interface card 184, or through a serial port, such as an RS-232 port, provided by the computer 82. The PLC 176 may couple to the computer 82 through a serial port, Ethernet port, or a proprietary interface. The fieldbus interface card 172 may be comprised in the computer 82 and may interface through a fieldbus network to one or more fieldbus devices. Each of the DAQ card 114, the serial card 184, the fieldbus card 172, the image acquisition card 134, and the motion control card 138 are typically plugged in to an I/O slot in the computer 82 as described above. However, these cards 114, 184, 172, 134, and 138 are shown external to computer 82 for illustrative purposes. In typical industrial automation systems a device will not be present of each interface type, and in fact many systems may only have one or more devices of a single interface type, such as only PLCs. The devices may be coupled to the device or process 150.

As used herein, the term "instrument" is intended to include any of the devices that are adapted to be connected to a computer system as shown in FIGS. 2A and 2B, traditional "stand-alone" instruments, as well as other types of measurement and control devices. The term "measurement function" may include any type of data acquisition, measurement or control function, such as that implemented by the instruments shown in FIGS. 2A and 2B. For example, the term "measurement function" includes acquisition and/or processing of an image. In one embodiment, a graphical program that undergoes programmatic analysis and modification as described herein may implement a measurement function. Graphical programs which perform data acquisition, analysis and/or presentation, e.g., for measurement, instrumentation control, industrial automation, or simulation, such as in the applications shown in FIGS. 2A and 2B, may be referred to as virtual instruments.

Figure 3:
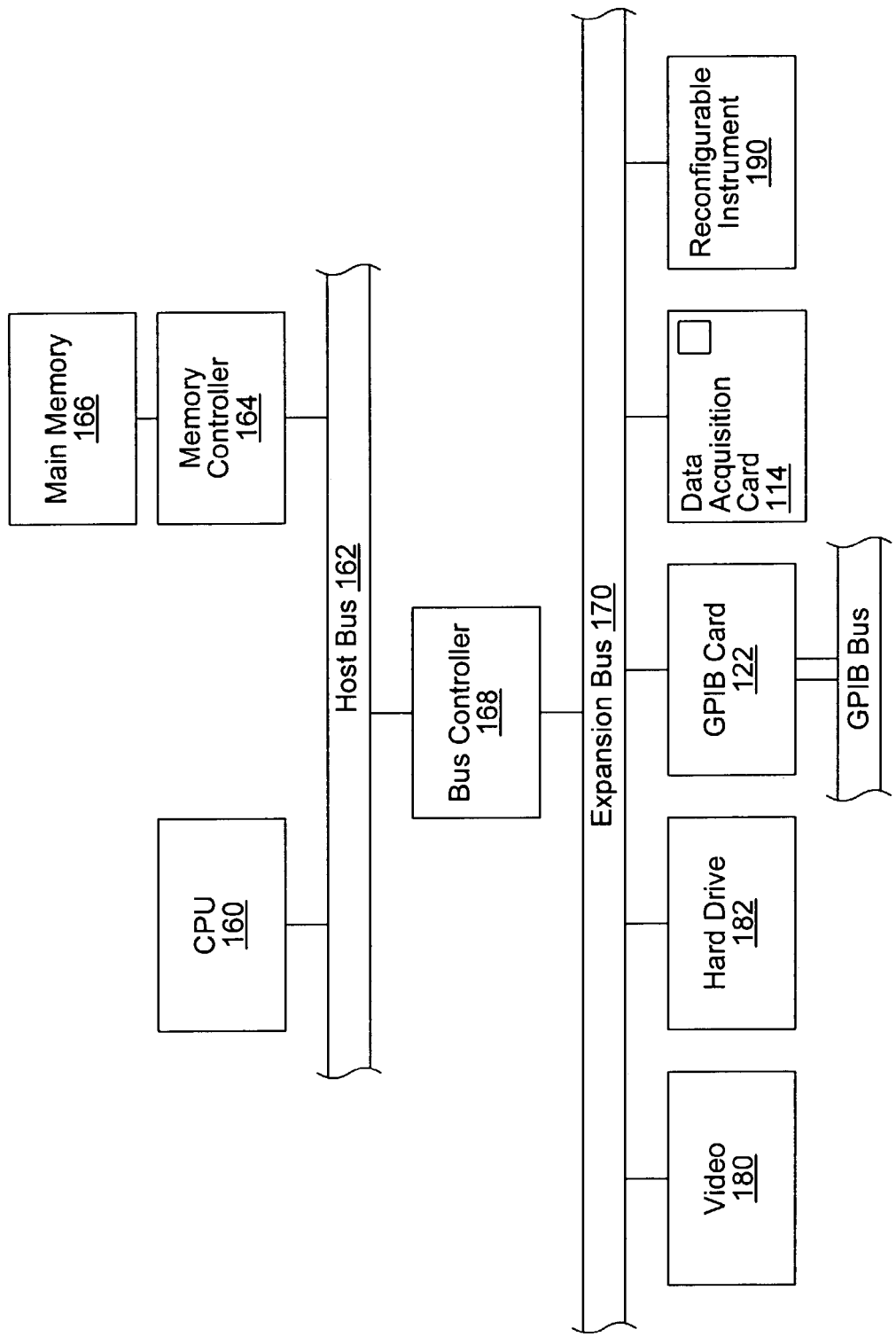
FIG. 3 is an exemplary block diagram of a computer system shown in FIGS. 1, 1A, 1B, 2A and/or 2B.

FIG. 3—Computer System Block Diagram

FIG. 3 is a block diagram representing one embodiment of the computer system 82 and/or 90 illustrated in FIGS. 1, 1A, 1B, 2A and/or 2B. It is noted that any type of computer system configuration or architecture can be used as desired, and FIG. 3 illustrates a representative PC embodiment. It is also noted that the computer system may be a general purpose computer system, a computer implemented on a VXI card installed in a VXI chassis, a computer implemented on a PXI card installed in a PXI chassis, or other types of embodiments. Elements of a computer not necessary to understand the present description have been omitted for simplicity.

The computer may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164. In one embodiment, the main memory 166 may store a graphical program to be programmatically analyzed and/or modified. In one embodiment, the main memory may also, or may alternatively, store software operable to programmatically analyze and/or modify a graphical program. In one embodiment, the main memory 166 may store software operable to communicate via a network to programmatically analyze and/or modify a graphical program. As one example, where the analysis and modification are performed in a client/server fashion, the main memory 166 may store the client-side software or the server-side software responsible for performing the analysis/modification. The main memory 166 may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as a data acquisition board 114 and a GPIB interface card 122 which provides a GPIB bus interface to a GPIB instrument. The computer 82 further comprises a video display subsystem 180 and hard drive 182 coupled to the expansion bus 170. As shown, in one embodiment a reconfigurable instrument 190 may also be connected to the expansion bus 170.

In one embodiment, one or more of the interface cards or devices coupled to the expansion bus, such as the DAQ card 114, the GPIB interface card 122, the GPIB instrument 112, or a VXI or MXI bus card 186 may comprise an embedded system including an embedded CPU and embedded memory. In this embodiment, the graphical program that is programmatically analyzed and modified may be executed in the embedded system. Also, the graphical program may be programmatically analyzed/modified first and may then be transferred to the embedded system, or the graphical program may be programmatically analyzed/modified while it is stored in the embedded system. Similarly, in one embodiment one or more of the interface cards or devices coupled to the expansion bus may include configurable logic, such as an FPGA, on which the graphical program is executed.

Figure 4:
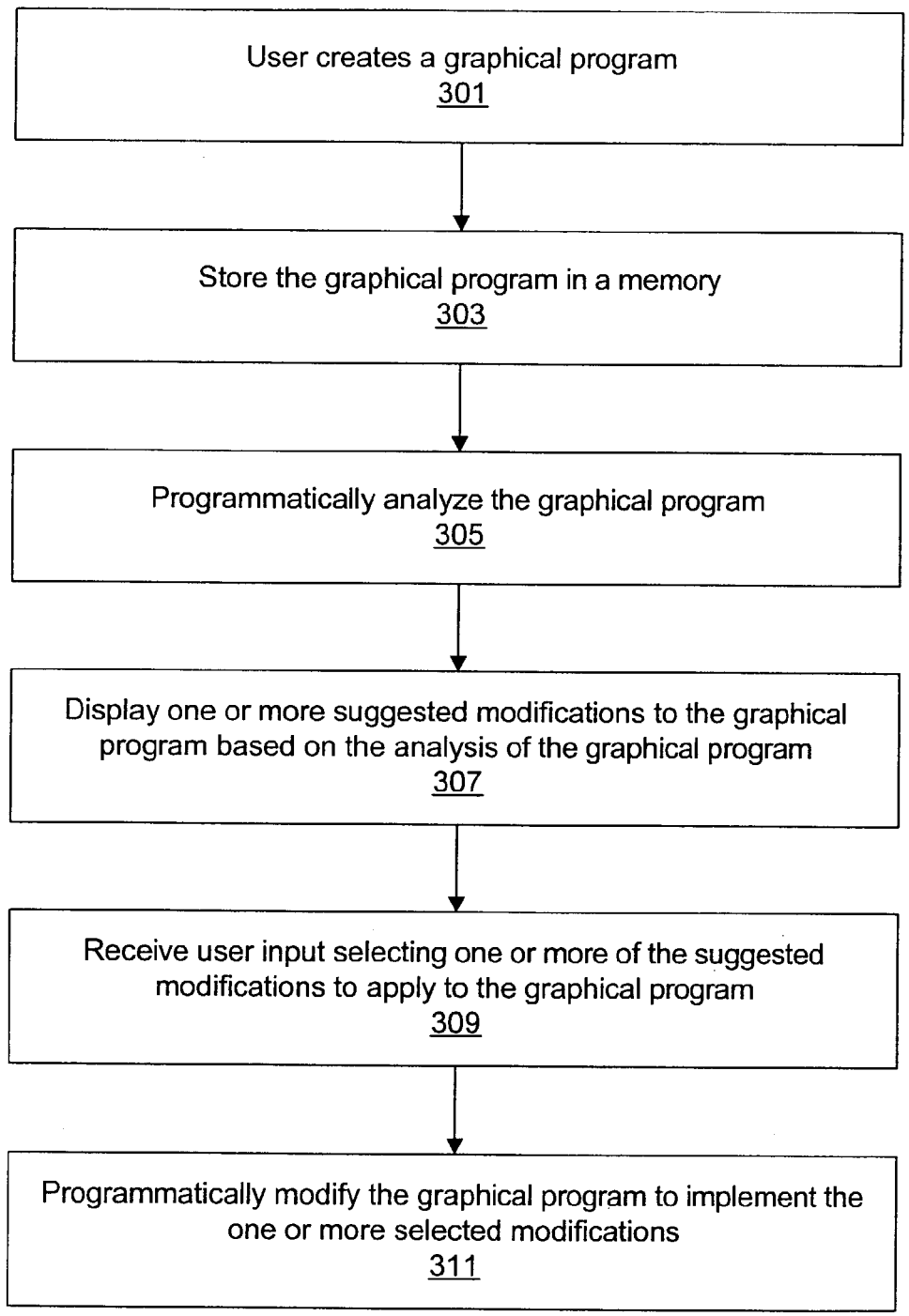
FIG. 4 is a flowchart diagram illustrating one embodiment of a method for programmatically analyzing and modifying a graphical program.

FIG. 4—Programmatically Analyzing and Modifying a Graphical Program

FIG. 4 is a flowchart diagram illustrating one embodiment of a method for programmatically analyzing and modifying a graphical program. It is noted that FIG. 4 illustrates a representative embodiment, and alternative embodiments are contemplated.

In 301, a user may create the graphical program. In various embodiments, the graphical program may be created using any graphical programming development environment. Examples of graphical programming development environments for creating graphical programs include LabVIEW, DasyLab, and DiaDem from National Instruments; VEE from Agilent; WiT from Coreco; Vision Program Manager from PPT Vision; SoftWIRE from Measurement Computing; Simulink from the MathWorks; Sanscript from Northwoods Software; Khoros from Khoral Research; SnapMaster from HEM Data; and VisSim from Visual Solutions, among others.

Creating the graphical program may include creating a block diagram for the graphical program. The block diagram may be created in response to direct user input, e.g., the user may create the block diagram by placing or "dragging and dropping" icons or nodes on the display and interconnecting the nodes in a desired fashion. The plurality of nodes in the block diagram may be interconnected in response to user input to visually indicate functionality of the graphical program. The block diagram may have one or more of data flow, control flow, and/or execution flow representations.

Creating the graphical program may also include creating a graphical user interface or front panel, e.g., in response to user input. The graphical user interface may be created in any of various ways, e.g., depending on the graphical programming development environment used. Creating the graphical user interface or front panel may comprise specifying various user interface elements. These user interface elements may include elements such as one or more windows or panels, menu bars, context menus, etc., as well as various user interface controls and indicators for receiving program input and/or displaying program output. Examples of user interface controls and indicators include charts, graphs, push buttons, knobs, numeric controls, text boxes, list boxes, check boxes, etc.

In another embodiment, the graphical program may be programmatically generated rather than being manually created by a user. The above-incorporated patent application titled, "System and Method for Programmatically Generating a Graphical Program in Response to Program Information" discussed various examples of programmatically or automatically generating graphical programs.

In 303, the graphical program may be stored in a memory. For example, the graphical program may be stored in a memory of a computer system which executes a program to programmatically analyze/modify the graphical program, as described below. Storing the graphical program in the memory may include storing one or more data structures representing the graphical program in the memory and/or storing program instructions for the graphical program in the memory. The memory may be a memory of the same computer system which executes the program to programmatically analyze/modify the graphical program, or may be located elsewhere, e.g., in a different computer system or device.

In 305, the graphical program may be programmatically analyzed. In various embodiments, the graphical program may be a graphical program that performs any function for any application, and the graphical program may be analyzed to determine any information or characteristics regarding the graphical program. Several exemplary graphical program analyses are discussed below.

Programmatically analyzing the graphical program may include any technique or method implemented by a program that inspects or examines the graphical program. For example, programmatically analyzing the graphical program may include analyzing the one or more data structures representing the graphical program in the memory, e.g., to determine graphical program elements (e.g., nodes, programmatic structures such as loops or case structures, user interface elements, etc.) present in the graphical program and/or to determine a relationship among these graphical program elements.

In 307, one or more suggested modifications to the graphical program may be displayed. The one or more suggested modifications may be based on the analysis of the graphical program performed in 305. The suggested modifications which are displayed may depend on the purpose or reason for analyzing the graphical program. For example, in one embodiment, the goal may be to increase performance of the graphical program. Thus, in 305 the graphical program may be programmatically analyzed to determine information indicative of the graphical program's performance, and in

307 one or more suggestions for increasing the performance may be displayed based on this information.

In various embodiments, any of various aspects of the graphical program's performance may be programmatically analyzed, such as the graphical program's execution speed, execution determinism, input/output throughput, network communication throughput, etc. For example, the above-incorporated patent application titled, "Wizard for Programmatically Analyzing and Modifying Time-Critical Graphical Programs" describes a method for increasing the performance of a graphical program which performs one or more repetitive operations. Specifically, a method for eliminating time latency problems resulting from performing user interface functions within a time-critical graphical program is disclosed.

In another embodiment, the goal may be to modify functionality of the graphical program. For example, the graphical program may perform first functionality. It may be desirable to programmatically analyze the graphical program to determine one or more portions of graphical source code responsible for implementing this first functionality. In this case, one or more suggestions for changing the first functionality may be displayed. Also, as described below, in one embodiment the graphical program may be programmatically modified to perform second functionality instead of the first functionality.

In another embodiment, the goal may be to correct problems present in the graphical program. For example, the graphical program may be syntactically correct, but may have one or more semantic errors, e.g., as a result of improperly using one or more nodes in the graphical program in a way which is not intended or as a result of a particular combination of interconnected nodes which is invalid. Thus, a tool may be provided to the user to automatically analyze his graphical programs for such problems and display suggestions on how to modify the graphical programs.

As a related example, the graphical program may be developed or stored on a first computer system, and the user may desire to deploy the graphical program on a second computer system for execution, where the second computer system is a different type of computer system than the first computer system. For example, the first computer system may be a general purpose computer system, and the second computer system may be a target device such as an FPGA, a PDA, an embedded system in a device, etc. The graphical program may execute correctly on the first computer system but may include one or more portions of graphical source code which do not execute correctly on the second computer system, e.g., due to graphical program elements which are unsupported for the second computer system or due to semantic differences. Thus, a tool may be provided which is operable to automatically analyze the user's graphical program to determine such problems and display suggestions for modifying the graphical program (and possibly automatically modify the graphical program to fix the problems, as described below).

In another embodiment, the goal may be to update the graphical program. For example, the graphical program may be a graphical program that was created using an older version of a graphical programming development environment. This graphical program may not be compatible with a newer version of the graphical programming development environment. For example, the newer version may no longer support one or more of the graphical program nodes used in the graphical program, the semantics of one or more nodes may have changed in the newer version, the input/output parameters of one or more nodes may have changed, programming constructs used in the graphical program may have been superceded by new constructs, etc. Thus, a translator tool may be operable to analyze the original graphical program and display suggestions for modifying the graphical program to execute correctly under the newer version of the graphical programming development environment (and may possibly automatically update the graphical program, as described below).

As a related example, a tool may be operable to perform bug fixes or other updates to a graphical program. For example, one or more graphical programs may have been installed on the user's computer system as part of a software application installation procedure. The tool may be operable to analyze these graphical programs to periodically update their functionality or provide bug fixes. As another example, a graphical programming development environment may be operable to assist users by automatically (programmatically) generating various portions of graphical source code for inclusion in graphical programs. It may be desirable to provide a tool which analyzes existing graphical programs to determine such portions of automatically generated graphical source code in order to automatically update the generated graphical source code, similarly as described above. In one embodiment, a tool located on a remote computer system may be operable to remotely perform this programmatic analysis (and possibly programmatic modification also, as described below).

In another embodiment, the goal may be to perform a "search and replace" function for one or more graphical programs. For example, the user may specify a first node and a second node. A tool may programmatically analyze the graphical program(s) to find instances of the first node and may optionally prompt the user to replace them with the second node. In another embodiment, the user may specify a first graphical source code template and a second graphical source code template. The tool may programmatically analyze the graphical program(s) to find instances of the first graphical source code template and may optionally prompt the user to replace them with the second graphical source code template.

In another embodiment, the goal may be to modify the graphical program so that its execution can be distributed across multiple computer systems. As one example, it may be desirable to modify a graphical program so that the program executes on one computer system, and the graphical program's user interface is displayed on a second computer system. Thus a tool may programmatically analyze the graphical program to locate graphical source code related to user interface functionality and may programmatically modify the graphical program to communicate with the second computer system to display the user interface.

As noted above, displaying the one or more suggested modifications to the graphical program in 307 may be performed in any of various ways, e.g., depending on the particular reason for performing the analysis of the graphical program. In various embodiments, 307 may comprise displaying information of any kind. For example, in one embodiment, text information indicating the one or more suggested modifications may be displayed. In another embodiment, displaying the one or more suggested modifications to the graphical program may comprise visually altering an appearance of the graphical program to indicate the one or more suggested modifications. In another embodiment, displaying the one or more suggested modifications to the graphical program may comprise displaying one or more suggested portions of graphical source code to include in the graphical program. In addition to displaying suggested modifications to the block diagram or graphical source code of the graphical program, in one embodiment, one or more suggested modifications to a graphical user interface of the graphical program may be displayed.

In one embodiment, the suggested modifications may be not only displayed, but may also be automatically, i.e., programmatically applied to the graphical program. As shown in 309, in one embodiment, the user may be able to select which of the suggested modifications to automatically apply to the graphical program. User input selecting one or more of the suggested modifications to apply to the graphical program may be received. Various techniques may be used to prompt the user for this user input. For example, in one embodiment, the user may simply click a button or perform another action to request all the suggested modifications to be applied. In another embodiment, the user may be able to select a subset of the modifications to apply or may be prompted for a decision on whether to apply each modification one at a time.

In an alternative embodiment, the suggested modifications may be not displayed and/or the user may not be prompted to select which modifications to apply. Instead, the method may simply programmatically analyze the graphical program and programmatically modify the graphical program based on the analysis, without interacting with the user as described above.

In 311, the graphical program may be programmatically modified to implement the one or more suggested modifications selected in 309. The graphical program may be programmatically modified with little or no input received during the modification process. In one embodiment, the method may include displaying a series of user interface panels or screens to guide the user through the process of modifying the graphical program or to allow the user to specify options affecting the analysis of the graphical program or the modifications made to the graphical program. This series of screens may be referred to as a "wizard".

It is noted that the above examples of reasons for programmatically analyzing graphical programs are intended to be exemplary only. The method described above may be utilized to programmatically analyze and/or modify a graphical program in any way and for any desired purpose or application.

Figure 4A:
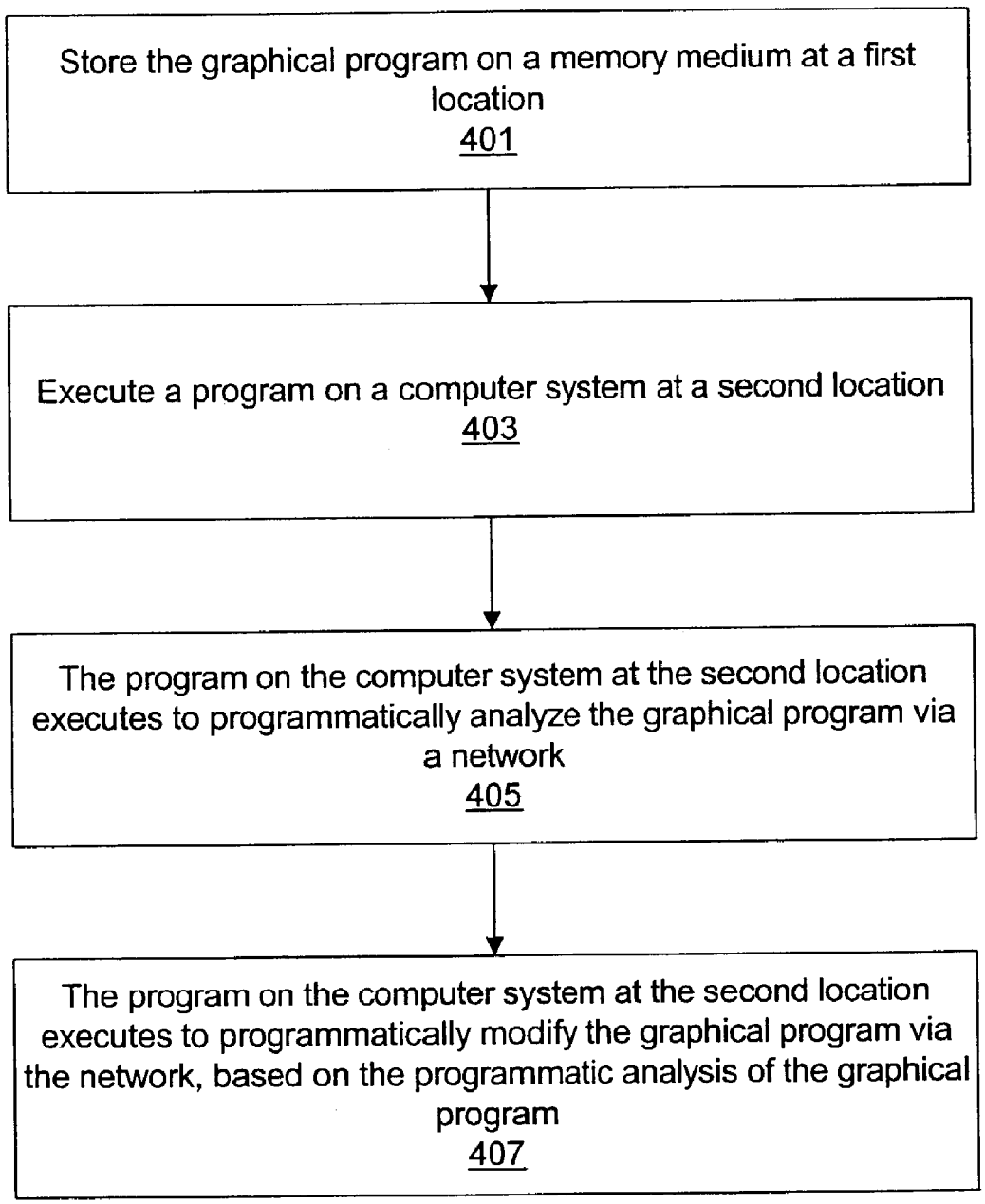
FIG. 4A is a flowchart diagram illustrating one embodiment of a method for programmatically analyzing and modifying a graphical program via a network.

FIG. 4A—Programmatically Analyzing and Modifying a Graphical Program Via a Network As discussed above with reference to FIGS. 1A and 1B, in various embodiments a graphical program may be programmatically analyzed and/or modified via a network. FIG. 4A is a flowchart diagram illustrating one embodiment of a method for programmatically analyzing and modifying a graphical program via a network. It is noted that FIG. 4A illustrates a representative embodiment, and alternative embodiments are contemplated. Also, various elements may be combined, omitted, or performed in different orders.

In 401, the graphical program may be stored on a memory medium at a first location. For example, in various embodiments, storing the graphical program may comprise storing the graphical program on or in one or more of a disk drive, a file system, random access memory (RAM), a magnetic medium, and/or an optical medium.

In 403, a program may be executed on a computer system at a second location. As described below, the program may be involved in programmatically analyzing and/or programmatically modifying the graphical program. The computer system at the second location may be coupled via a network (such as the network 84 described above) to the memory medium at the first location or may be coupled to a computer system or device which includes or has access to the memory medium at the first location. In various embodiments, the second location may be anywhere relative to the first location. For example, in one embodiment the computer at the second location may be coupled via the Internet to a geographically remote computer system which stores the graphical program. In another embodiment, the computer system at the second location may be coupled via a LAN to a relatively near device or instrument on which the graphical program is stored or deployed.

In 405, the program on the computer system at the second location may execute to programmatically analyze the graphical program via the network. As shown in 407, in one embodiment the program on the computer system at the second location may also execute to programmatically modify the graphical program via the network, based on the programmatic analysis of the graphical program. In various embodiments, the graphical program may be programmatically analyzed and/or modified for any of various purposes, similarly as described above with reference to FIG. 4.

In various embodiments, any of various communication techniques may be used to programmatically analyze/modify the graphical program via the network. Where the graphical program is stored on a memory medium of a first computer system at the first location, the computer system at the second location (also referred to as the second computer system) may communicate with the first computer system via the network to programmatically analyze/modify the graphical program.

In one embodiment, a program executing on the first computer system may request modification of the graphical program, e.g., in a client/server fashion. In one embodiment, the modification may be requested in response to user input received to the first computer system. For example, a user may execute a program on the first computer system which presents a graphical user interface allowing the user to specify desired analyses to perform on the graphical program and/or desired modifications to make to the graphical program. The program on the first computer system may then transmit the information specified by the user to the second computer system. In response, the program on the second computer system may communicate with the program on the first computer system to programmatically analyze and/or modify the graphical program according to the information specified by the user.

In various embodiments, the actual modification to the graphical program may be performed by the first computer system, the second computer system, or a combination of both. For example, in one embodiment the graphical program may be sent from the first computer system to the second computer system. The program on the second computer system may then programmatically analyze/modify the graphical program and send a modified version of the graphical program back to the first computer system. The first computer system may then replace the graphical program on the memory medium with the modified version of the graphical program, e.g., may replace the graphical program in the first computer system's RAM or on a disk drive or other memory medium associated with the first computer system.

In another embodiment, the graphical program may not need to be sent to the second computer system. For example, the program on the first computer system may include an application programming interface (APT) through which the program on the second computer system can issue commands to obtain information regarding the graphical program and request modifications to the graphical program. In this example, the program on the second computer system may include the logic necessary for controlling the analysis/modification to the graphical program, and the program on the first computer system may simply respond to commands or requests from the program on the second computer system.

As noted above, in one embodiment the graphical program may be programmatically analyzed/modified in response to a user requesting a desired analysis or modification of the graphical program. In various embodiments, the user may specify the desired analysis/modification in any of various ways. In one embodiment, the desired analysis/modification may be specified indirectly. For example, the user may interact with a graphical user interface to specify desired characteristics or functionality of the graphical program. The program on the second computer system may then execute to analyze the graphical program to determine necessary modifications or additions to the graphical source code of the graphical program so that the modified graphical program has the specified characteristics or functionality. As one example, the user may utilize a tool specialized for measurement applications which is operable to communicate with a remote computer server (i.e., the computer system at the second location) to request that the graphical program be modified to perform a specified measurement or instrumentation task (or to request creation of a graphical program operable to perform a specified measurement or instrumentation task).

In the examples discussed above, the computer system at the second location may analyze/modify the graphical program in response to a request received from a computer system at the first location. In other embodiments, the analysis/modification of the graphical program may be initiated by the computer system at the second location. For example, as described above with reference to FIG. 1B, in one embodiment the graphical program may be stored or deployed on a configurable device 80. In this example, the computer system at the second location may initiate communication with the configurable device 80 to programmatically analyze/modify the graphical program and may possible re-deploy the modified graphical program on the configurable device 80.

Similarly as described above with reference to FIG. 4, in one embodiment results of the programmatic analysis of the graphical program may be displayed, e.g., one or more suggested modifications to the graphical program may be displayed. For example, where the analysis is initiated by a user of a first computer system at the first location, the suggested modifications may be displayed on a display of the first computer system. The user may be able to specify which of the displayed modifications to make to the graphical program. As another example, where the second computer system initiates the analysis of the graphical program, the results of the analysis, e.g., the suggested modifications, may be displayed on a display of the second computer system.

FIGS. 5-8—Exemplary Graphical Programs

The remainder of the disclosure discusses one particular application of programmatic analysis and modification of a graphical program. In this application, it is desired to programmatically modify a time-critical graphical program to improve its performance by removing user interface functionality from the time-critical graphical program.

The time-critical graphical program may first be programmatically analyzed to determine graphical source code in the program involved with user interface functionality. In one embodiment, this may involve programmatically determining one or more user interface nodes present in the time-critical graphical program. Each user interface node may be operable to perform one of: a) displaying data in a user interface indicator from a source wire or b) providing data from a user interface control to a sink wire. For example, LabVIEW graphical programs can include user interface nodes (referred to as user interface terminals) to/from which wires can be connected from/to other nodes in the graphical program. For example, a wire may be connected from an output terminal of another node in the graphical program to a user interface node representing a user interface indicator on the graphical user interface. This wire may thus be referred to as a source wire, since it is a source of data displayed on the user interface. Similarly, a wire may be connected from a user interface node representing a user interface control on the graphical user interface to an input terminal of another node in the graphical program. This wire may thus be referred to as a sink wire, since it is a sink for data received from the user interface.

The time-critical graphical program may be then programmatically modified to instead exchange data with a second graphical program. The second graphical program may be programmatically generated as a part of the process of modifying the time-critical graphical program. The second graphical program may then perform the user interface functionality previously performed by the time-critical graphical program.

For example, where the unmodified time-critical graphical program previously generated data and displayed the data in a user interface indicator, the programmatically modified time-critical graphical program may instead pass the data to the second graphical program, and the second graphical program may display the data in the user interface indicator. Similarly, where the unmodified time-critical graphical program previously received data from a user interface control, the programmatically modified time-critical graphical program may instead receive the data from the second graphical program, which receives the data from the user interface control. Thus, the user's original graphical program may be automatically modified, and a second graphical program may be automatically generated, such that the performance of the real-time or time-critical application is increased.

Figure 5:
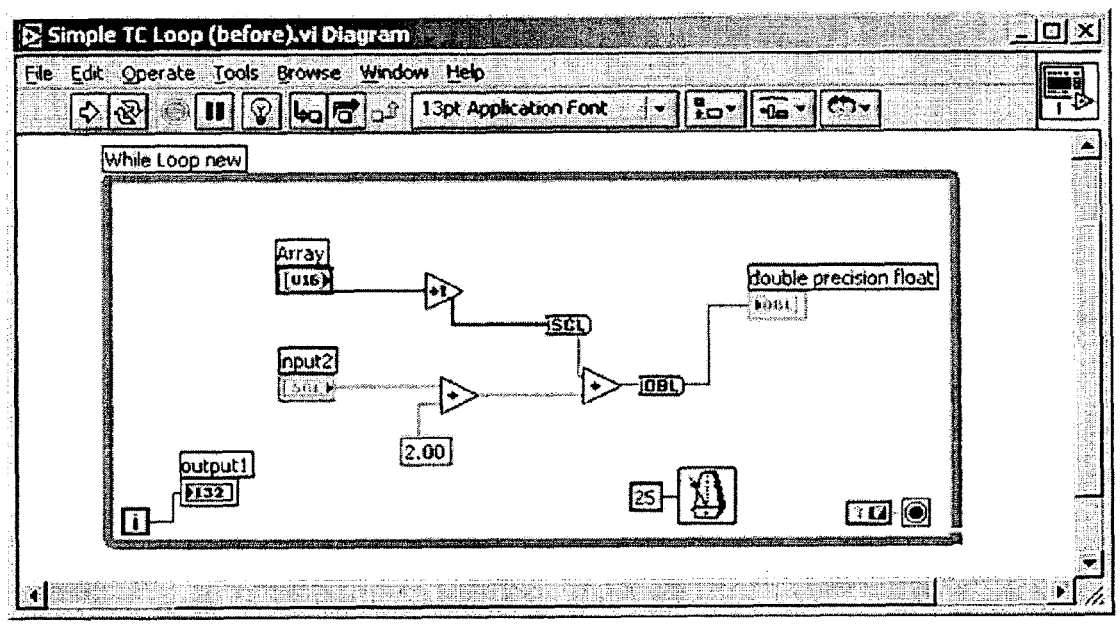
FIGS. 5-8 illustrate exemplary graphical programs related to an application in which a time-critical graphical program is programmatically analyzed and modified to improve its performance by removing user interface functionality from the time-critical graphical program.

FIG. 5 illustrates an exemplary time-critical graphical program created by a user. This example illustrates a simple graphical program for illustrative purposes only. As shown, the graphical program includes a while loop. The graphical source code inside the loop is performed for each loop iteration. In each iteration, first input data is received from a user interface control represented by the user interface node labeled, "Array". Also, second input data is received from a user interface control represented by the user interface node labeled, "input2". After some simple mathematical calculations performed on the input data, output data is provided to the user interface node labeled, "double precision float", which represents a user interface indicator that displays the output data. Also, the current loop iteration number is provided to the user interface node labeled, "output1", which represents a user interface indicator that displays the current iteration number.

Figure 6:
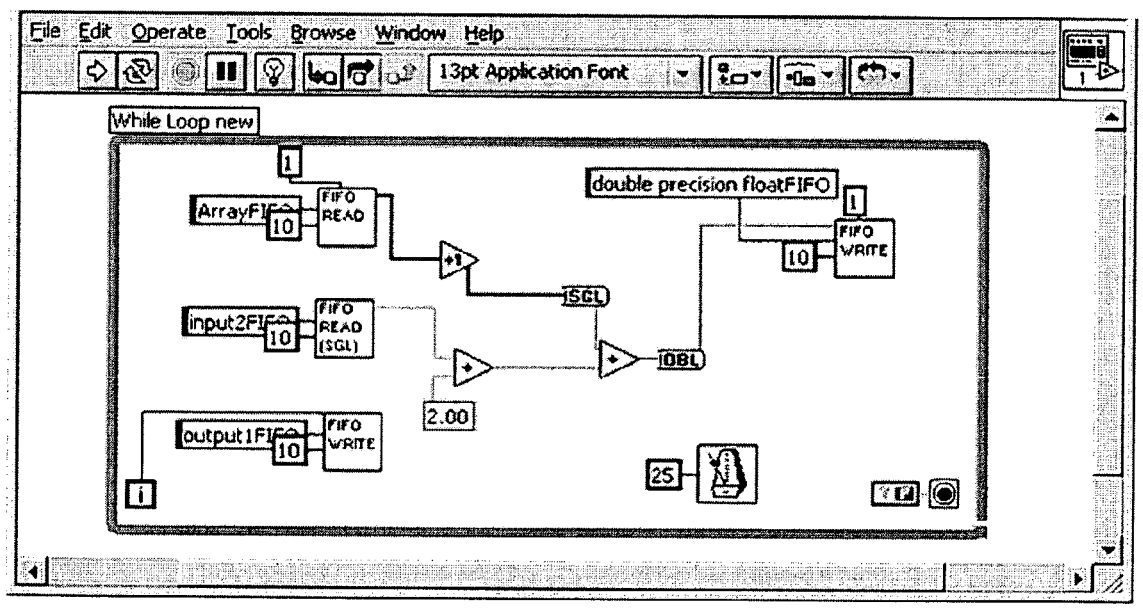

FIG. 6 illustrates the time-critical graphical program after being automatically modified as described above. As shown, the time-critical graphical program no longer performs a user interface function. The user interface nodes have been programmatically replaced with data read and data write nodes (RT FIFO nodes) as described above.

Figure 7:
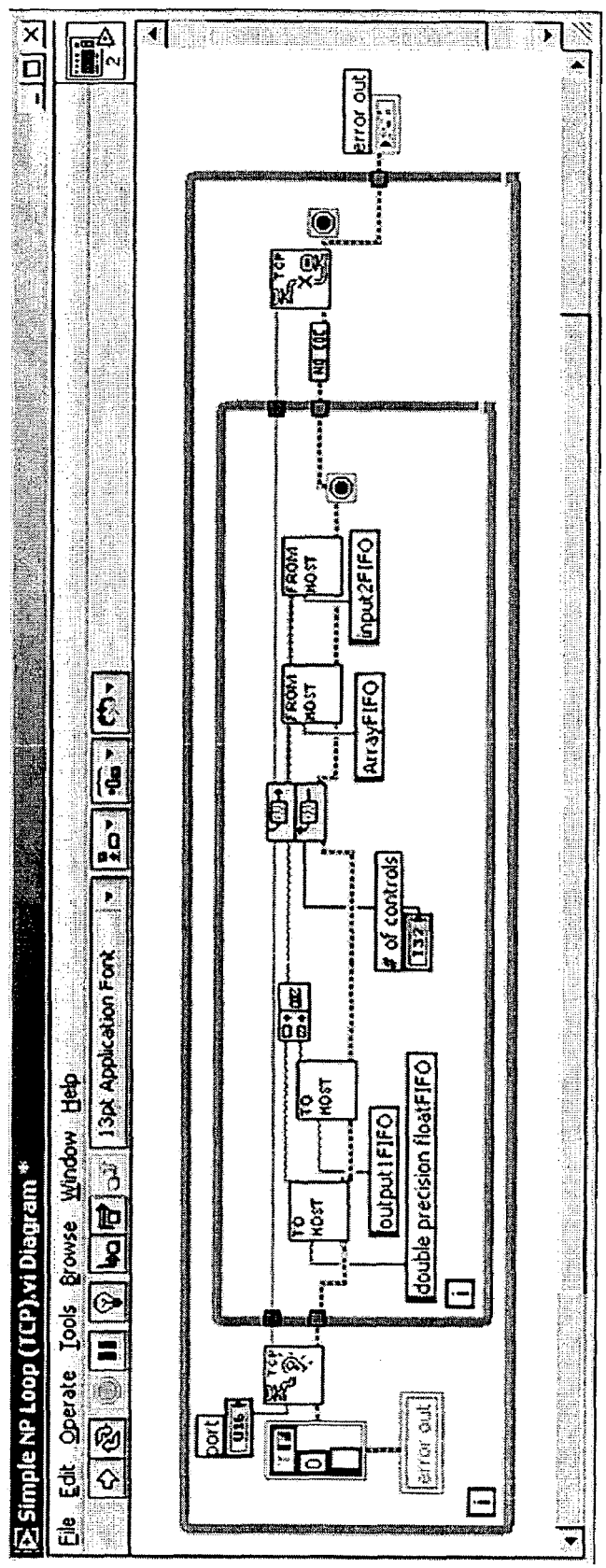

FIG. 7 illustrates a programmatically generated data exchange program that accompanies the modified time-critical graphical program. The data exchange graphical program includes a communication loop. Within the communication loop, two data read nodes corresponding to the two data write nodes in the time-critical graphical program have been included. Also, two data write nodes corresponding to the two data read nodes in the time-critical graphical program have been included. The TCP node on the left side of the graphical program is operable to receive data sent from a UI graphical program. The TCP node on the right side of the graphical program is operable to send data to the UI graphical program.

Figure 8:
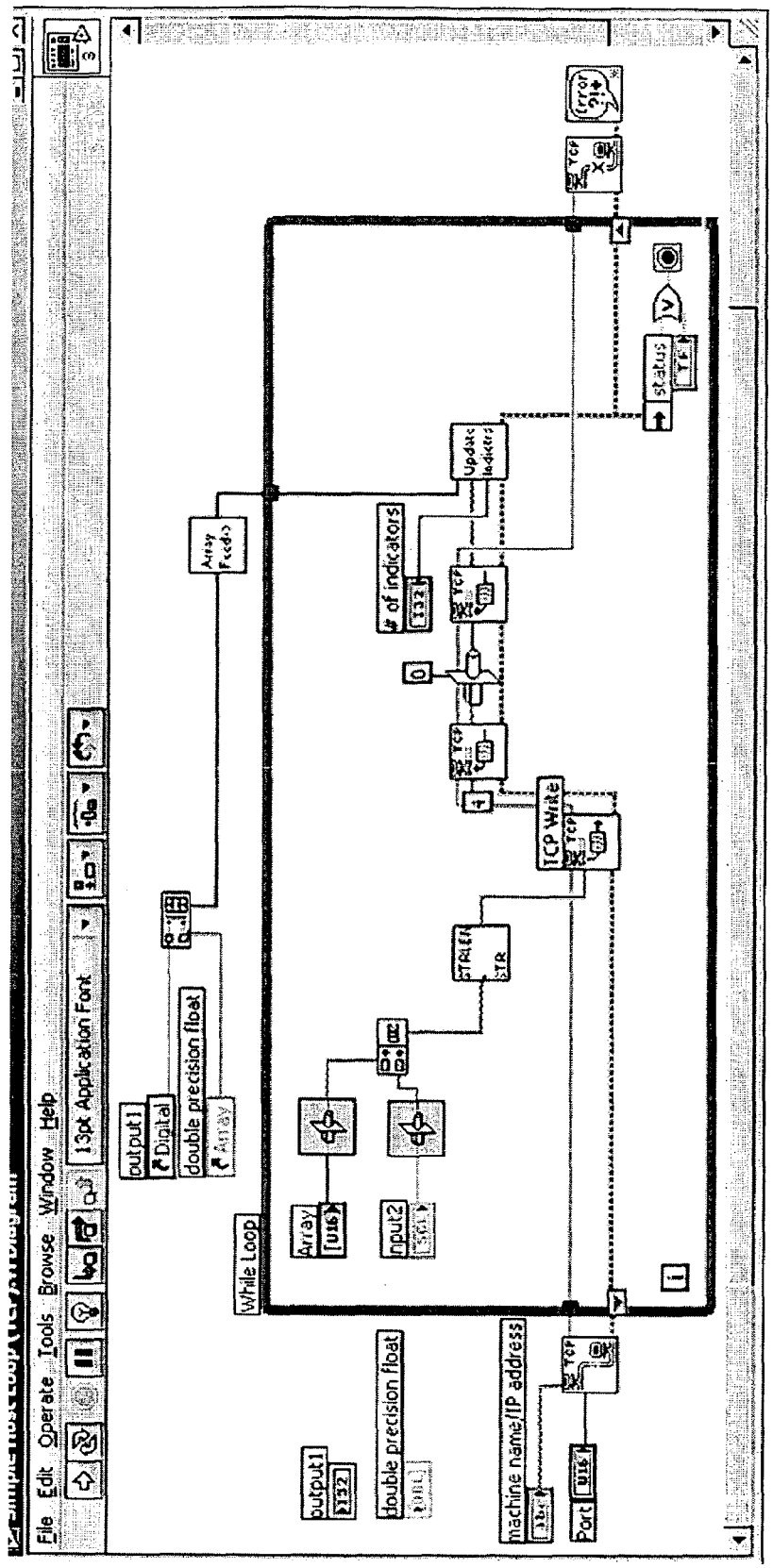

FIG. 8 illustrates a programmatically generated UI program that accompanies the data exchange graphical program. The UI graphical program includes two user interface nodes representing the two user interface indicators used in the original time-critical graphical program. These user interface nodes are labeled identically, i.e., "double precision float" and "outputl". Similarly, the UI graphical program includes two user interface nodes representing the two user interface controls used in the original time-critical graphical program. These user interface nodes are labeled identically, i.e., "Array" and "input2". The user interface nodes representing user interface controls have been placed inside of a loop where they can be read continuously. On the other hand, the user interface nodes representing user interface indicators may not need to be inside the loop, as shown.

For further details regarding this example, please refer to the above-incorporated patent application titled, "Wizard for Programmatically Analyzing and Modifying Time-Critical Graphical Programs".

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for automatically analyzing a graphical program, the method comprising:
   a first computer system accessing a memory medium over a network, wherein the memory medium stores the graphical program, and wherein the graphical program comprises a plurality nodes and connections between the nodes, wherein the plurality of interconnected nodes visually indicate functionality of the program;
   the first computer system automatically analyzing the graphical program stored on the memory medium, wherein said automatically analyzing the graphical program comprises automatically analyzing the plurality of nodes and the connections between the nodes; and
   displaying one or more suggested modifications to the graphical program based on said automatically analyzing, wherein said displaying the one or more suggested modifications comprises displaying one or more suggested modifications to at least one node and/or connection of the plurality of interconnected nodes which visually alters an appearance of the graphical program, wherein the one or more suggested modifications are selected from the following set:
   displaying a new node;
   removing a node;
   displaying a new connection;
   modifying a connection; and
   removing a connection.

2. The method of claim 1,
   wherein the memory medium is comprised in a second computer system, wherein the first computer system is coupled to the second computer system over the network.

3. The method of claim 1,
   wherein the graphical program comprises a graphical data flow program.

4. The method of claim 1,
   wherein said automatically analyzing the graphical program comprises automatically analyzing performance of the graphical program;
   wherein said displaying the one or more suggested modifications to the graphical program comprises displaying one or more suggested modifications to improve the performance of the graphical program.

5. The method of claim 1,
   wherein said automatically analyzing the graphical program comprises automatically analyzing functionality of the graphical program;
   wherein said displaying the one or more suggested modifications to the graphical program comprises displaying one or more suggested modifications to change the functionality of the graphical program.

6. The method of claim 1,
   wherein said automatically analyzing the graphical program comprises automatically determining an error in the graphical program;
   wherein said displaying the one or more suggested modifications to the graphical program comprises displaying a suggested modification to correct the error.

7. The method of claim 1,
   wherein said displaying the one or more suggested modifications to the graphical program comprises displaying text information indicating the one or more suggested modifications.

8. A memory medium comprising program instructions for automatically analyzing a graphical program, wherein the memory medium is comprised in a first computer system, wherein the program instructions are executable to implement:
   accessing a second memory medium over a network, wherein the second memory medium stores the graphical program, and wherein the graphical program comprises a plurality of nodes and connections between the nodes, and wherein the plurality of interconnected nodes visually indicate functionality of the program;
   automatically analyzing the graphical program stored on the second memory medium, wherein said automatically analyzing comprises automatically analyzing the plurality of nodes and the connections between the nodes; and
   displaying one or more suggested modifications to the graphical program based on said automatically analyzing, wherein said displaying the one or more suggested modifications comprises displaying one or more suggested modifications to at least one node and/or connection of the plurality of interconnected nodes which visually alters an appearance of the graphical program, wherein the one or more suggested modifications are selected from the following set:
   displaying a new node;
   removing a node;
   displaying a new connection;
   modifying a connection; and
   removing a connection.

9. The memory medium of claim 8,
   wherein the second memory medium is comprised in a second computer system, wherein the first computer system is coupled to the second computer system over the network.

10. The memory medium of claim 8,
    wherein the graphical program comprises a graphical data flow program.

11. The memory medium of claim 8,
    wherein said automatically analyzing the graphical program comprises automatically analyzing performance of the graphical program;
    wherein said displaying the one or more suggested modifications to the graphical program comprises displaying one or more suggested modifications to improve the performance of the graphical program.

12. The memory medium of claim 8,
wherein said automatically analyzing the graphical program comprises automatically analyzing functionality of the graphical program;
wherein said displaying the one or more suggested modifications to the graphical program comprises displaying one or more suggested modifications to change the functionality of the graphical program.

13. The memory medium of claim 8,
wherein said automatically analyzing the graphical program comprises automatically determining an error in the graphical program;
wherein said displaying the one or more suggested modifications to the graphical program comprises displaying a suggested modification to correct the error.

14. The memory medium of claim 8, wherein said displaying the one or more suggested modifications to the graphical program comprises displaying text information indicating the one or more suggested modifications.

15. A system, comprising:
a processor; and
a first memory medium coupled to the processor, wherein the first memory medium stores program instructions for automatically analyzing a graphical program, wherein the program instructions are executable to:
access a second memory medium over a network, wherein the second memory medium stores the graphical program and wherein the graphical program comprises a plurality of nodes and connections between the nodes, and wherein the plurality of interconnected nodes visually indicate functionality of the program;
automatically analyze the graphical program stored on the second memory medium, wherein said automatically analyzing comprises automatically analyzing the plurality of nodes and the connections between the nodes; and
display one or more suggested modifications to the graphical program based on said automatically analyzing, wherein said displaying the one or more suggested modifications comprises displaying one or more suggested modifications to at least one node and/or connection of the plurality of interconnected nodes which visually alters an appearance of the graphical program, wherein the one or more suggested modifications are selected from the set of:
displaying a new node;
removing a node;
displaying a new connection;
modifying a connection; and
removing a connection.

16. The system of claim 15,
wherein the processor and the first memory medium are comprised in a first computer system; and
wherein the second memory medium is comprised in a second computer system, wherein the first computer system is coupled to the second computer system over the network.

17. The system of claim 15,
wherein the graphical program comprises a graphical data flow program.

18. The system of claim 15,
wherein said automatically analyzing the graphical program comprises automatically analyzing performance of the graphical program;
wherein said displaying the one or more suggested modifications to the graphical program comprises displaying one or more suggested modifications to improve the performance of the graphical program.

19. The system of claim 15,
wherein said automatically analyzing the graphical program comprises automatically analyzing functionality of the graphical program;
wherein said displaying the one or more suggested modifications to the graphical program comprises displaying one or more suggested modifications to change the functionality of the graphical program.

20. The system of claim 15,
wherein said automatically analyzing the graphical program comprises automatically determining an error in the graphical program;
wherein said displaying the one or more suggested modifications to the graphical program comprises displaying a suggested modification to correct the error.

21. The system of claim 15,
wherein said displaying the one or more suggested modifications to the graphical program comprises displaying text information indicating the one or more suggested modifications.

* * * * *